(12) United States Patent
Li

(10) Patent No.: US 12,265,954 B2
(45) Date of Patent: Apr. 1, 2025

(54) PAYMENT INTERFACE DISPLAY METHOD AND APPARATUS AND ELECTRONIC DEVICE

(71) Applicant: VIVO MOBILE COMMUNICATION CO., LTD., Dongguan (CN)

(72) Inventor: Zhichuan Li, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 9 days.

(21) Appl. No.: 18/127,649

(22) Filed: Mar. 28, 2023

(65) Prior Publication Data

US 2023/0237448 A1 Jul. 27, 2023

Related U.S. Application Data

(63) Continuation of application No. PCT/CN2021/120654, filed on Sep. 26, 2021.

(30) Foreign Application Priority Data

Sep. 29, 2020 (CN) .......................... 202011049067.6

(51) Int. Cl.
*G06Q 20/10* (2012.01)
*G06F 3/0481* (2022.01)
(Continued)

(52) U.S. Cl.
CPC .......... *G06Q 20/10* (2013.01); *G06F 3/0481* (2013.01); *G06F 3/04842* (2013.01); *G06F 3/04847* (2013.01); *G06F 3/04886* (2013.01)

(58) Field of Classification Search
CPC ............. G06Q 20/367; G06Q 20/3229; G06Q 10/0832; G06Q 20/10; G06F 3/0488;
(Continued)

(56) References Cited

U.S. PATENT DOCUMENTS 10,990,934 B2 * 4/2021 Van Os ................... G06Q 20/34
11,599,870 B2 * 3/2023 Je .......................... G06Q 20/367
(Continued)

FOREIGN PATENT DOCUMENTS

| CN | 105574755 A | 5/2016 |
|---|---|---|
| CN | 106157125 A | 11/2016 |

(Continued)

OTHER PUBLICATIONS

International Search Report issued in corresponding International Application No. PCT/CN2021/120654, mailed Dec. 30, 2021, 6 pages.
(Continued)

*Primary Examiner* — Hani M Kazimi
*Assistant Examiner* — Sanjeev Malhotra
(74) *Attorney, Agent, or Firm* — IPX PLLC

(57) ABSTRACT

A payment interface display method and apparatus and an electronic device are provided. The payment interface display method includes: receiving a first input; displaying a first interface in response to the first input, where the first interface includes at least one payment control, and each payment control is associated with a payment function interface; receiving a second input for a target payment control, where the target payment control is a payment control of the at least one payment control; and displaying, in response to the second input, the target payment function interface associated with the target payment control.

15 Claims, 11 Drawing Sheets

(51) Int. Cl.
*G06F 3/04842* (2022.01)
*G06F 3/04847* (2022.01)
*G06F 3/04886* (2022.01)

(58) Field of Classification Search
CPC .............. G06F 3/0481; G06F 3/04842; G06F 3/04847; G06F 3/04886
USPC ...................... 705/13, 35, 38, 26; 235/462.1
See application file for complete search history.

(56) References Cited

U.S. PATENT DOCUMENTS

| | | | | |
|---|---|---|---|---|
| 11,631,075 | B2* | 4/2023 | Nam .................... | G06Q 20/409 705/13 |
| 11,775,151 | B2* | 10/2023 | Chang .................. | G06F 3/0481 705/41 |
| 2003/0065552 | A1* | 4/2003 | Rubinstenn .......... | A61B 5/0059 705/26.7 |
| 2004/0093279 | A1* | 5/2004 | Yamanoue ....... | G11B 20/00086 |
| 2007/0100743 | A1* | 5/2007 | Barge .................... | G06Q 99/00 705/38 |
| 2009/0307078 | A1* | 12/2009 | Mithal ................... | H04L 12/14 705/26.1 |
| 2015/0170201 | A1* | 6/2015 | Tayebi ............... | H04N 1/32352 705/14.66 |
| 2015/0287133 | A1* | 10/2015 | Marlov .............. | G06Q 10/0832 705/35 |
| 2016/0234193 | A1* | 8/2016 | Chen ...................... | G06Q 30/06 |
| 2017/0287061 | A1* | 10/2017 | Chae .................. | G06Q 20/3278 |
| 2017/0364904 | A1 | 12/2017 | Wang et al. | |
| 2018/0108076 | A1 | 4/2018 | Tu | |
| 2020/0065470 | A1* | 2/2020 | Van Os .................... | G06F 21/36 |
| 2020/0134602 | A1* | 4/2020 | Je ........................ | G06Q 20/3674 |
| 2021/0084137 | A1* | 3/2021 | Kang .................. | G07C 9/00309 |
| 2021/0374714 | A1* | 12/2021 | Chang ................ | G06Q 20/3267 |
| 2023/0161990 | A1* | 5/2023 | Li ......................... | G06K 7/1417 235/462.1 |
| 2023/0237448 | A1* | 7/2023 | Li ........................... | G06Q 20/10 705/39 |
| 2023/0362123 | A1* | 11/2023 | Dye ...................... | G06Q 10/10 |
| 2023/0368791 | A1* | 11/2023 | Walker, II .......... | G10L 15/1815 |

FOREIGN PATENT DOCUMENTS

| | | |
|---|---|---|
| CN | 106325753 A | 1/2017 |
| CN | 107220826 A | 9/2017 |
| CN | 109471570 A | 3/2019 |
| CN | 111309237 A | 6/2020 |
| CN | 112148198 A | 12/2020 |
| CN | 112181559 A | 1/2021 |
| EP | 3261039 A1 | 12/2017 |
| EP | 4220388 A1 | 8/2023 |

OTHER PUBLICATIONS

First Office action issued in related Chinese Application No. 202011049067.6 mailed Aug. 23, 2021, 11 pages.

Extended European Search Report issued in related European Application No. 21874383.9, mailed Feb. 28, 2024, 9 pages.

* cited by examiner

PAYMENT INTERFACE DISPLAY METHOD AND APPARATUS AND ELECTRONIC DEVICE

CROSS-REFERENCE TO RELATED APPLICATIONS

The application is a continuation of International Application No. PCT/CN2021/120654, filed on Sep. 26, 2021, which claims priority to Chinese Patent Application No. 202011049067.6, filed on Sep. 29, 2020. The entire contents of each of the above-identified applications are expressly incorporated herein by reference.

TECHNICAL FIELD

The present application belongs to the technical field of electronic devices, and in particular, relates to a payment interface display method and apparatus and an electronic device.

BACKGROUND

The vigorous development of the mobile Internet has made people's daily life very convenient. Some applications can be used for online payment, which greatly promotes the convenience of payment, improves the efficiency of payment scenarios, and reduces the costs of banknotes and thus contributes to the protection of the environment and sustainable development.

When making payment, users need to open application programs of corresponding manufacturers first, and then find corresponding payment interfaces in the application programs. For users who are not familiar with relevant operations or users who perform the operations for the first time, this process is relatively cumbersome. For users who are familiar with the operations, the previous series of operations are somewhat redundant, which affects the overall efficiency of the payment process.

SUMMARY

The embodiments of the present application provide a payment interface display method and apparatus and an electronic device.

According to a first aspect, the embodiments of the present application provide a payment interface display method, including:

receiving a first input; and displaying a first interface in response to the first input, where the first interface includes at least one payment control, and each payment control is associated with a payment function interface;

receiving a second input for a target payment control, where the target payment control is a payment control of the at least one payment control; and displaying, in response to the second input, a target payment function interface associated with the target payment control.

According to a second aspect, the embodiments of the present application provide a payment interface display apparatus, including:

a first receiving module, configured to receive a first input; and a first response module, configured to display a first interface in response to the first input, where the first interface includes at least one payment control, and each payment control is associated with a payment function interface;

a second receiving module, configured to receive a second input for a target payment control, where the target payment control is a payment control of the at least one payment control; and a processing module, configured to display, in response to the second input, a target payment function interface associated with the target payment control.

According to a third aspect, the embodiments of the present application provide an electronic device, where the electronic device includes a processor, a memory, and a program or an instruction stored in the memory and capable of running on the processor, and when the program or the instruction is executed by the processor, the steps of the method according to the first aspect are implemented.

According to a fourth aspect, the embodiments of the present application provide a readable storage medium, where the readable storage medium stores a program or an instruction, and when the program or the instruction is executed by a processor, the steps of the method according to the first aspect are implemented.

According to a fifth aspect, the embodiments of the present application provide a chip, where the chip includes a processor and a communications interface, the communications interface is coupled to the processor, and the processor is configured to run a program or an instruction, to implement the method according to the first aspect.

According to a sixth aspect, the embodiments of the present application provide a computer program product stored in a readable storage medium, and the computer program product is executed by at least one processor to implement the method according to the first aspect.

According to a seventh aspect, the embodiments of the present application provide a payment interface display apparatus, configured to execute the method according to the first aspect.

In the embodiments of the present application, at least one payment control is integrated on the first interface. After the first input is received, the first interface is quickly displayed, and the payment function interface required by the user can be directly accessed according to the second input.

DETAILED DESCRIPTION

The following describes the embodiments of the present application with reference to the accompanying drawings in the embodiments of the present application. Apparently, the described embodiments are some rather than all of the embodiments of the present application. Based on the embodiments of the present application, all other embodiments obtained by a person of ordinary skill in the art without creative efforts fall within the protection scope of the present application.

The terms "first," "second," and the like in this specification and claims of the present application are used to distinguish between similar objects instead of describing a specific order or sequence. It should be understood that the data used in this way is interchangeable in appropriate circumstances so that the embodiments of the present application described can be implemented in other orders than the order illustrated or described herein. In addition, in the specification and the claims, "and/or" represents at least one of connected objects, and a character "/" generally represents an "or" relationship between associated objects.

With reference to the accompanying drawings, the following describes in detail the payment interface display method in the embodiments of the present application based on specific embodiments and application scenarios.

Figure 1:
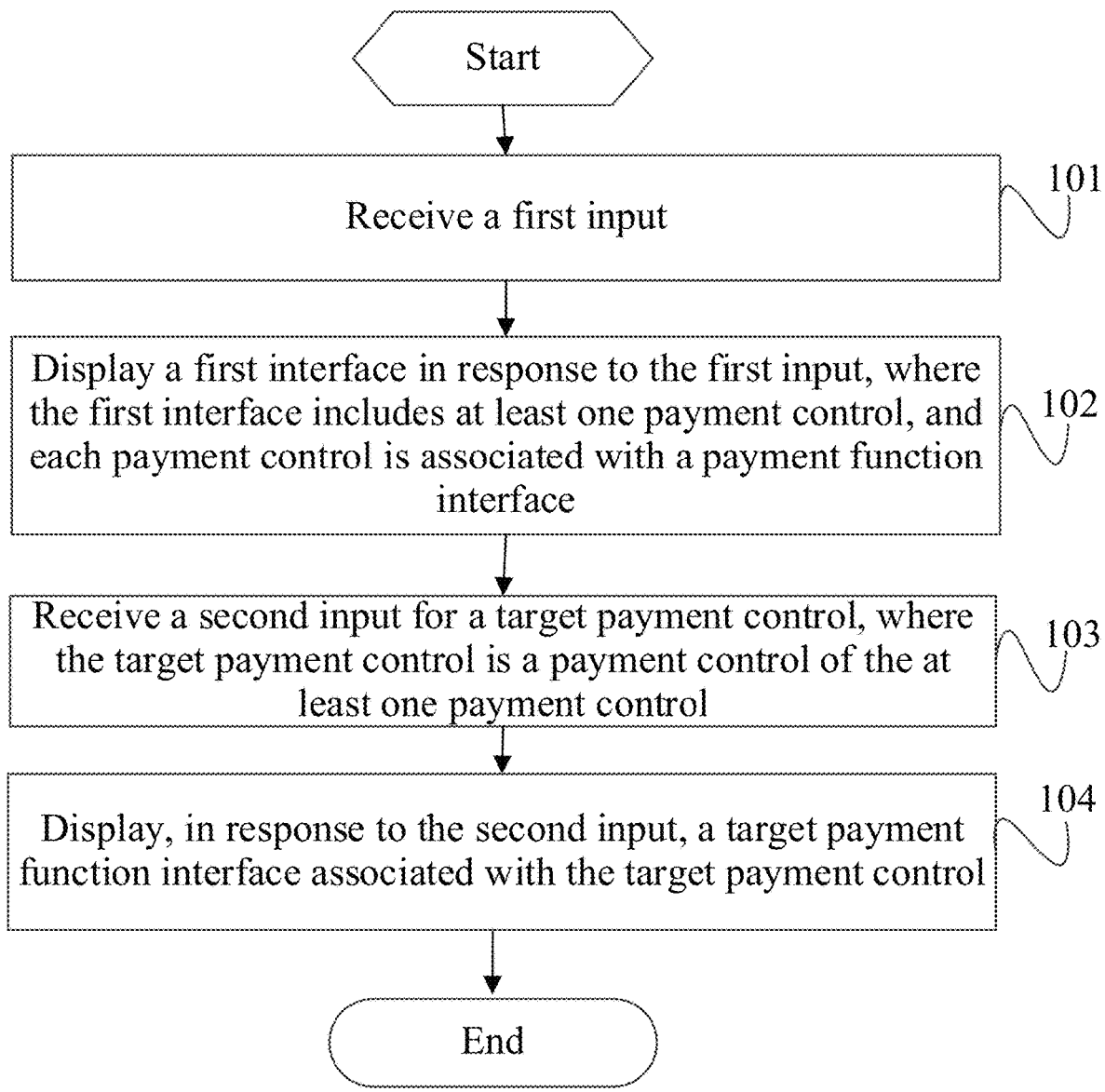
FIG. 1 is a schematic flowchart of a payment interface display method according to an embodiment of the present application.

As shown in FIG. 1, embodiments of the present application provide a payment interface display method, including:

Step 101: Receive a first input.

The first input may be a sliding input of a user on the screen of an electronic device. For example, when the electronic device is in a screen-off state, a locked screen state, or an unlocked state, the user slides to the left from the right edge of the screen.

In some implementations, the first input may also be an instruction input or other inputs, which is not specifically limited herein.

Step 102: Display a first interface in response to the first input, where the first interface includes at least one payment control, and each payment control is associated with a payment function interface.

Figure 2:
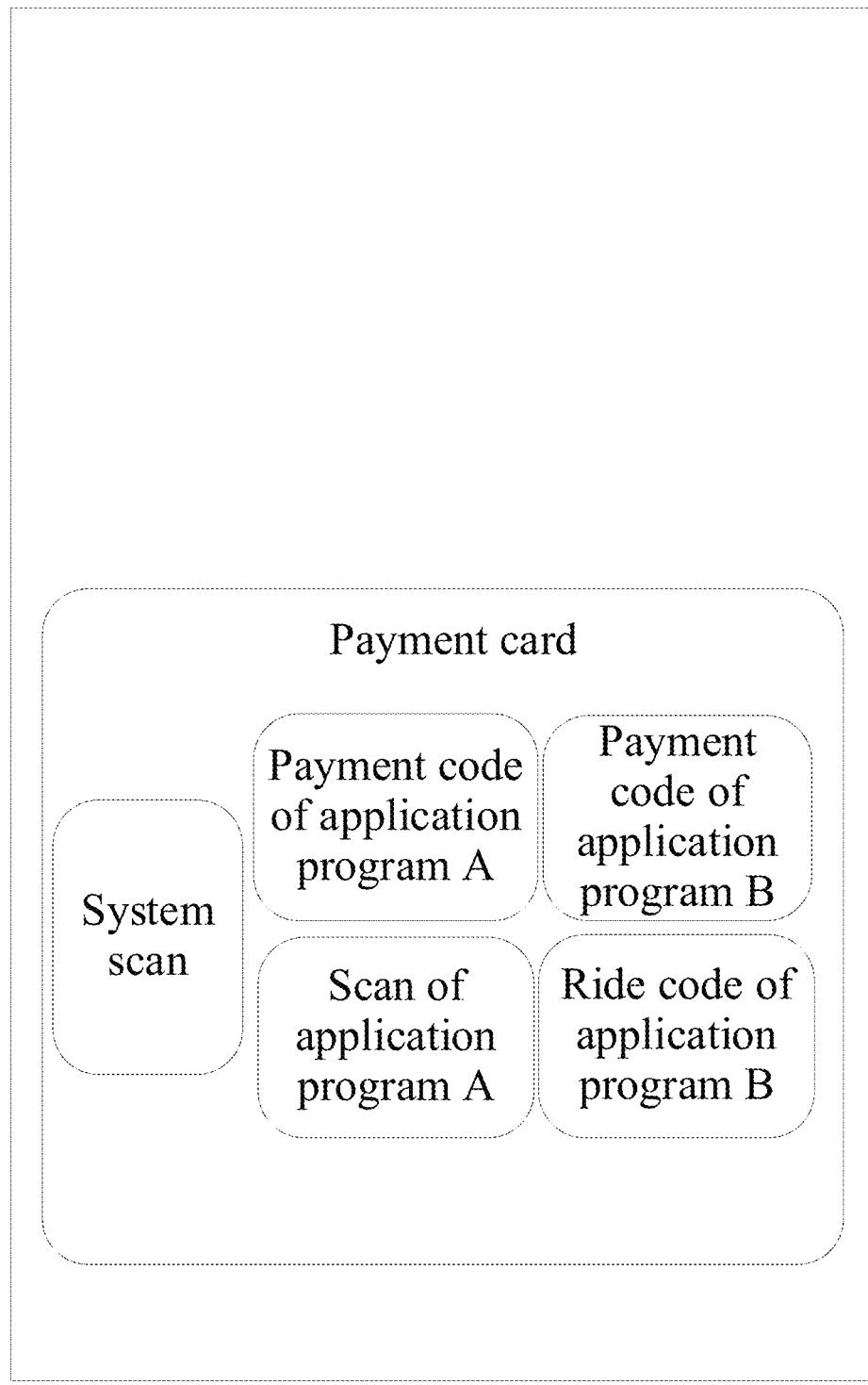
FIG. 2 is a schematic display diagram of a first interface according to an embodiment of the present application.

In some implementations, different payment controls are associated with different payment function interfaces. In this step, as shown in FIG. 2, the first interface includes at least one payment control, which can be set according to user requirements. For example, the payment control can be a scan payment control of application program A, or the payment code of application program A, or the ride code of application program B. The first interface may also be referred to as a payment card.

Here, by integrating at least one payment control on the first interface, it is convenient for the user to quickly select the required payment control.

In some implementations, in this step, when the screen of the electronic device is in a screen-off state, after receiving the first input, a track route corresponding to the first input is displayed on the screen, the screen is turned on, and a preset animation effect is used to display the first interface.

When the screen of the electronic device is in a screen-on state, after the first input is received, the first interface is displayed according to a preset animation effect following a finger inputting the first input.

In some implementations, the preset animation effect may be that an animation smoothly slides into the center of the screen from right to left, and during the display of the first interface, content on the screen is blurred in real time to shield interference of other content, so that the user can clearly and intuitively see the content of the first interface.

Figure 3:
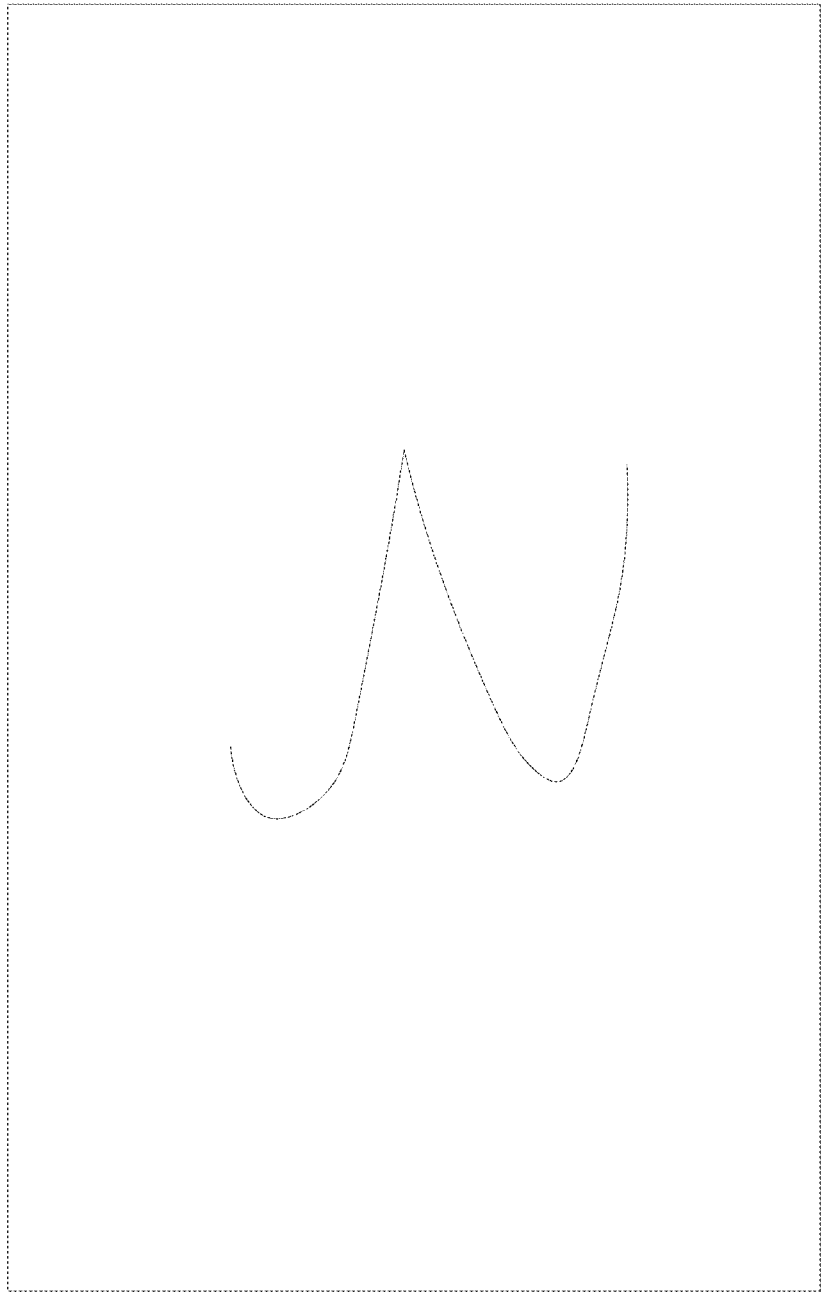
FIG. 3 is a schematic diagram of a trajectory of a first input according to an embodiment of the present application.

Exemplarily, when the screen is in a screen-off state, the user slides leftwards from the right edge of the screen, after the left slide gesture is completed, as shown in FIG. 3, a line animation of a gesture track is displayed on the screen off interface, after the animation ends, the screen is turned on, and then the first interface smoothly slides into the center of the screen as a right-to-left animation. During the sliding process, a current interface of the electronic device is blurred in real time and notifications, title bars, and the like displayed on the interface are all hidden, so that the content of the first interface can be displayed clearly and intuitively. In addition, when there are multiple payment cards, users can slide left and right to switch cards.

Step 103: Receive a second input for a target payment control, where the target payment control is a payment control of the at least one payment control.

The second input is an input for selecting a target payment control among at least one payment control displayed on the first interface, and the second input may be a click input.

In the embodiments of the present application, a payment control ranked first on the first interface is highlighted by default, and after the user selects the target payment control, the target payment control is highlighted, so that the user can view the currently selected target payment control.

Step 104: Display, in response to the second input, a target payment function interface associated with the target payment control.

Figure 4:
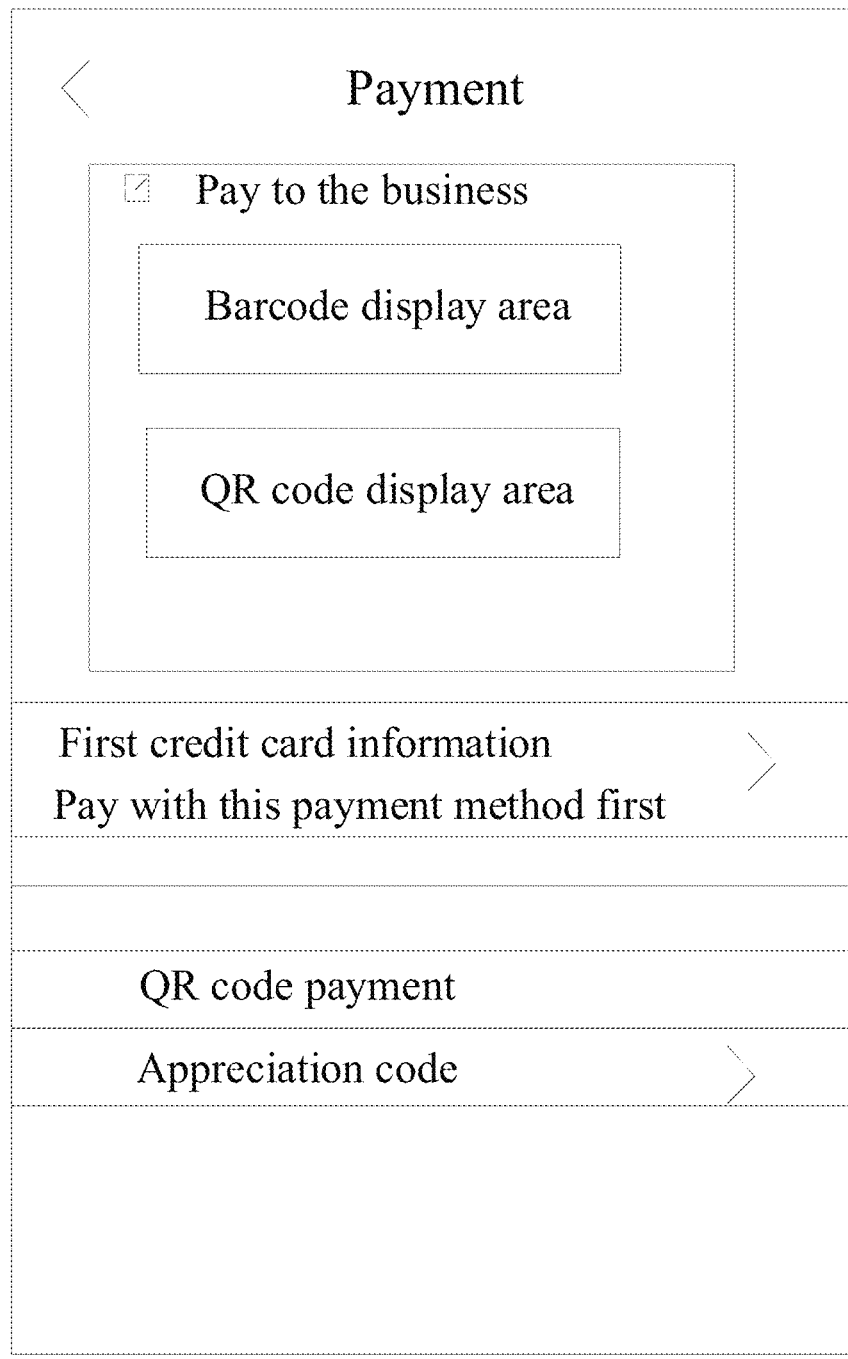
FIG. 4 is a schematic display diagram of a target payment function interface according to an embodiment of the present application.

In some implementations, in a process of displaying the target payment function interface associated with the target payment control, it is first determined whether a corresponding application program has been installed in the electronic device, if not, a text is used to prompt the user to install the application program, and the user directly inputs a detail interface of the application store after verification confirmation, to install the application program, and if the corresponding application has been installed, the target payment function interface is displayed directly. In some implementations, a specific schematic diagram of the target payment function interface is shown in FIG. 4.

In the payment interface display method in the embodiments of the present application, at least one payment control is integrated on the first interface. After the first input is received, the first interface is quickly displayed, and the payment function interface required by the user can be directly accessed according to the second input, which is easy to operate and greatly saves payment time and improves payment efficiency.

In some implementations, the displaying, in response to the second input, a target payment function interface corresponding to the target payment control includes:

When the screen is unlocked, the target payment function interface corresponding to the target payment control is displayed in response to the second input.

Herein, when the electronic device is in an unlocked state, the target payment function interface corresponding to the target payment control is directly displayed, so as to quickly and accurately reach the target payment function interface required by the user.

In some implementations, the displaying, in response to the second input, a target payment function interface associated with the target payment control includes:

When unlock verification information matches preset unlock verification information, the target payment function interface associated with the target payment control is displayed in response to the second input.

The payment interface display method of the embodiments of the present application further includes:

in the case that the screen is not unlocked, receiving a third input on the first interface, where the third input is an input performed on an unlock verification control on the first interface, or the third input is a predetermined input at a predetermined position on the first interface; and obtaining unlock verification information in response to the third input. The unlock verification control may be at least one of a face verification control, a fingerprint verification control, and a password verification control. The unlock verification information may be face, fingerprint, or password information input by the user.

Figure 5:
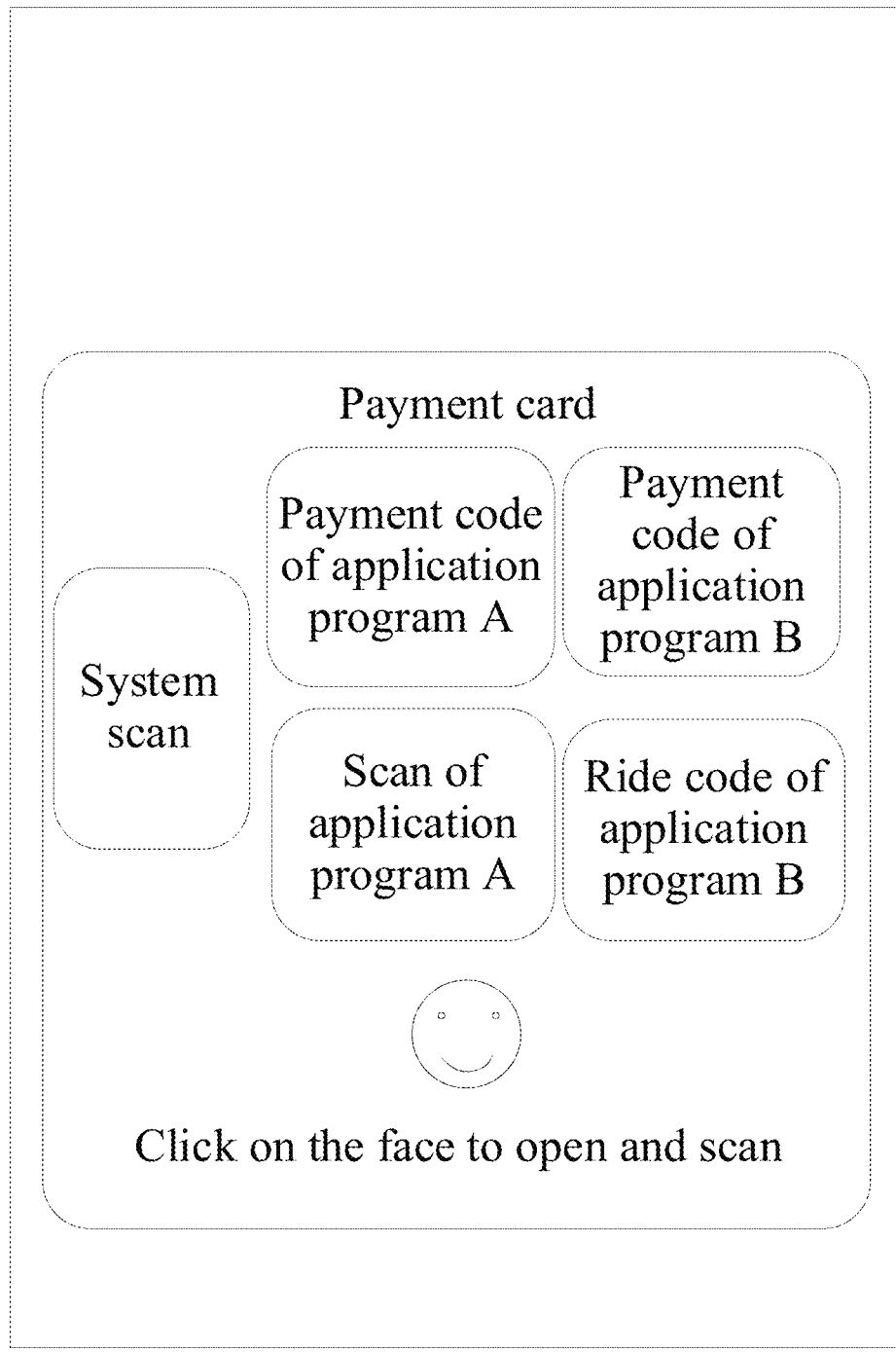
FIG. 5 is a schematic diagram of a first interface displaying a face verification control according to an embodiment of the present application.

Exemplarily, as shown in FIG. 5, when the unlock verification control is a face verification control, text prompt can be provided on the first interface, such as verifying the face to open a first payment function, and the third input is a click input performed on the face verification control. In this case, the face recognition function of the system is called to obtain the face information input by the user. When the face information inputted by the user matches the preset face information, an interface of the first payment function is displayed.

Figure 6:
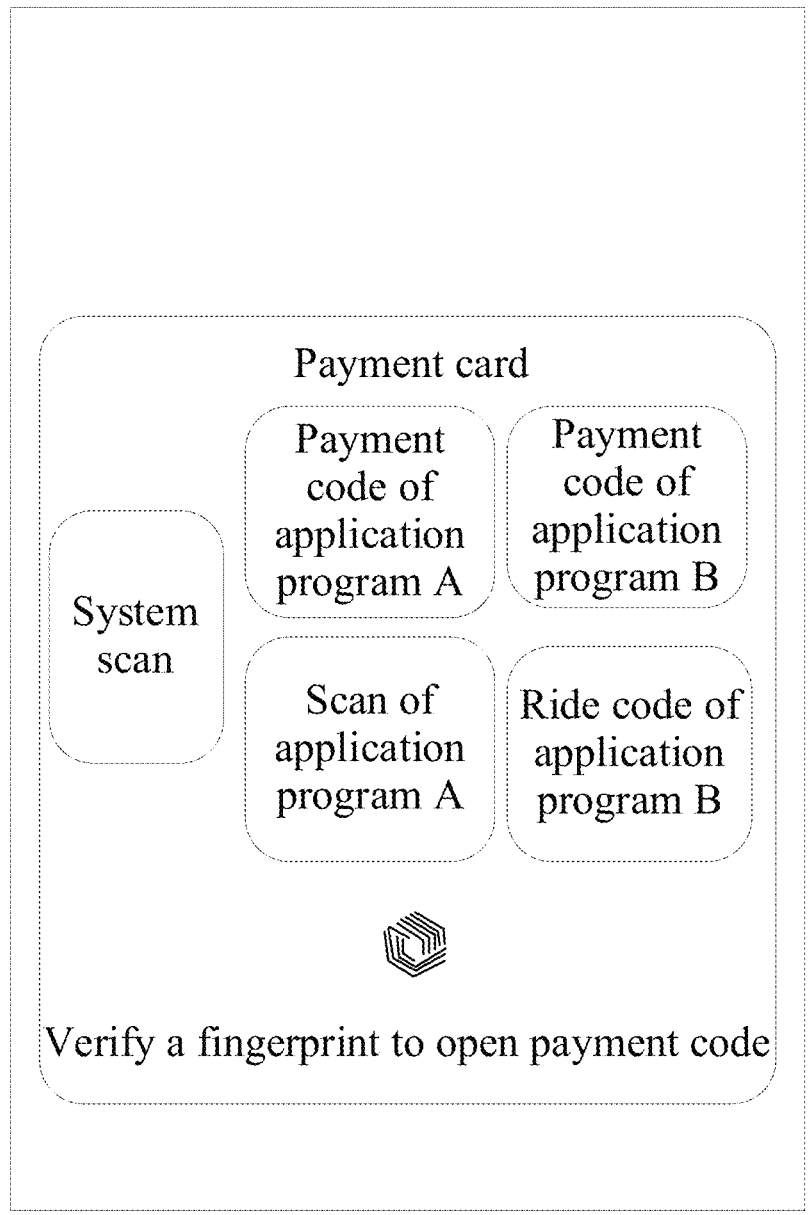
FIG. 6 is a schematic diagram of a first interface displaying a fingerprint verification control according to an embodiment of the present application.

As shown in FIG. 6, when the unlock verification control is a fingerprint verification control, text prompt can be provided on the first interface, such as verifying the fingerprint to open a second payment function, and the third input is a click input performed the fingerprint verification control. In this case, the fingerprint recognition function of the system is called to perform fingerprint recognition on the user. When the fingerprint input by the user matches the preset fingerprint, an interface of the second payment function is displayed.

Here, considering the security performance, the unlock verification process is added, and the corresponding function is directly accessed after the verification succeeds, which shortens the operation path and improves the use efficiency.

In some implementations, the obtaining, in response to the third input, unlock verification information input by the user includes:

displaying an unlock interface of the electronic device in response to the third input, where the unlock interface includes a virtual input keyboard and a screenshot of the first interface; and obtaining unlock verification information input by the user through the virtual input keyboard.

Figure 7:
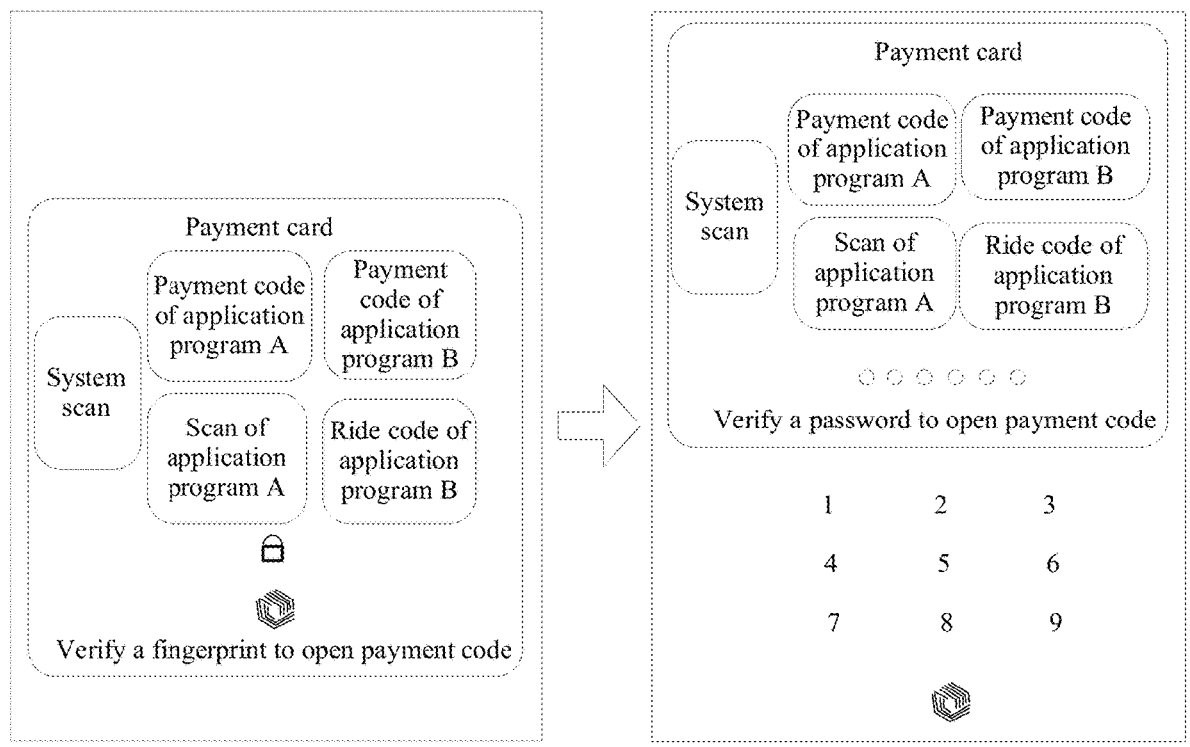
FIG. 7 is a schematic diagram of an unlock interface of a multiplexed electronic device according to an embodiment of the present application.

For example, when the unlock verification control is a password verification control, and the third input is the user's click input on the password verification control, the unlock interface of the electronic device is displayed as shown in FIG. 7. In some implementations, when the third input is a predetermined input at a predetermined position on the first interface, the unlock interface of the electronic device is displayed, for example, when the user slides upwards on the right side of the first interface, the unlock interface of the electronic device is displayed.

In some implementations, after the third input is received, screenshot processing is performed on the first interface, and the screenshot of the first interface is displayed at a preset position of the unlock interface, as shown in FIG. 7, displayed above the virtual input keyboard. The user inputs a lock screen password in the virtual input keyboard to unlock the screen. Herein, the unlock interface of the electronic device is directly reused for unlock, and the lock screen interface is directly used for prompts such as input errors.

In some implementations, the first interface includes a setting control, and the payment interface display method further includes:

receiving a fourth input performed on the setting control; and displaying a setting interface of the first interface in response to the fourth input, where the setting interface includes at least one of a display option and an editing option;

where the display option is used to set a display mode of the first interface in the lock screen state and/or the screen off state, and the editing option is used to add, delete, and/or move a payment control on the first interface.

Figure 8:
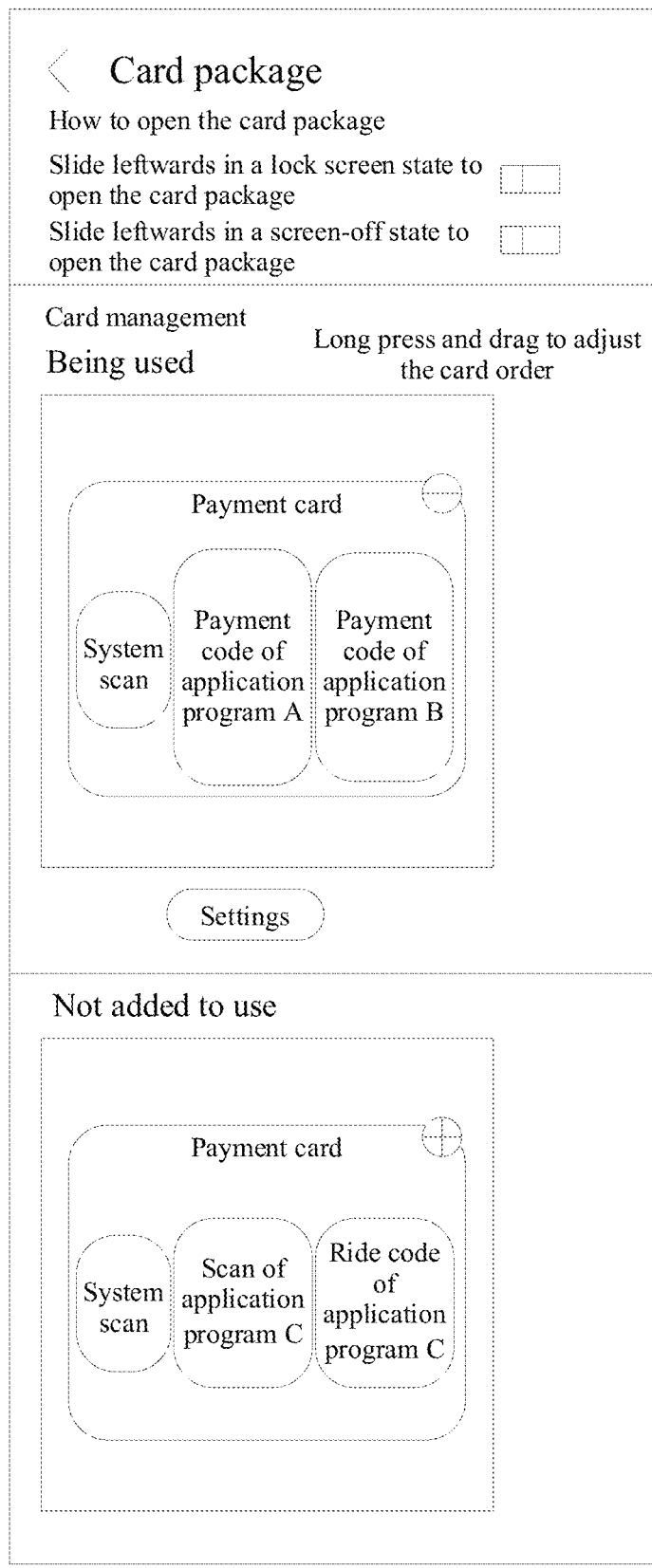
FIG. 8 is a schematic diagram of first setting of a first interface according to an embodiment of the present application.
Figure 9:
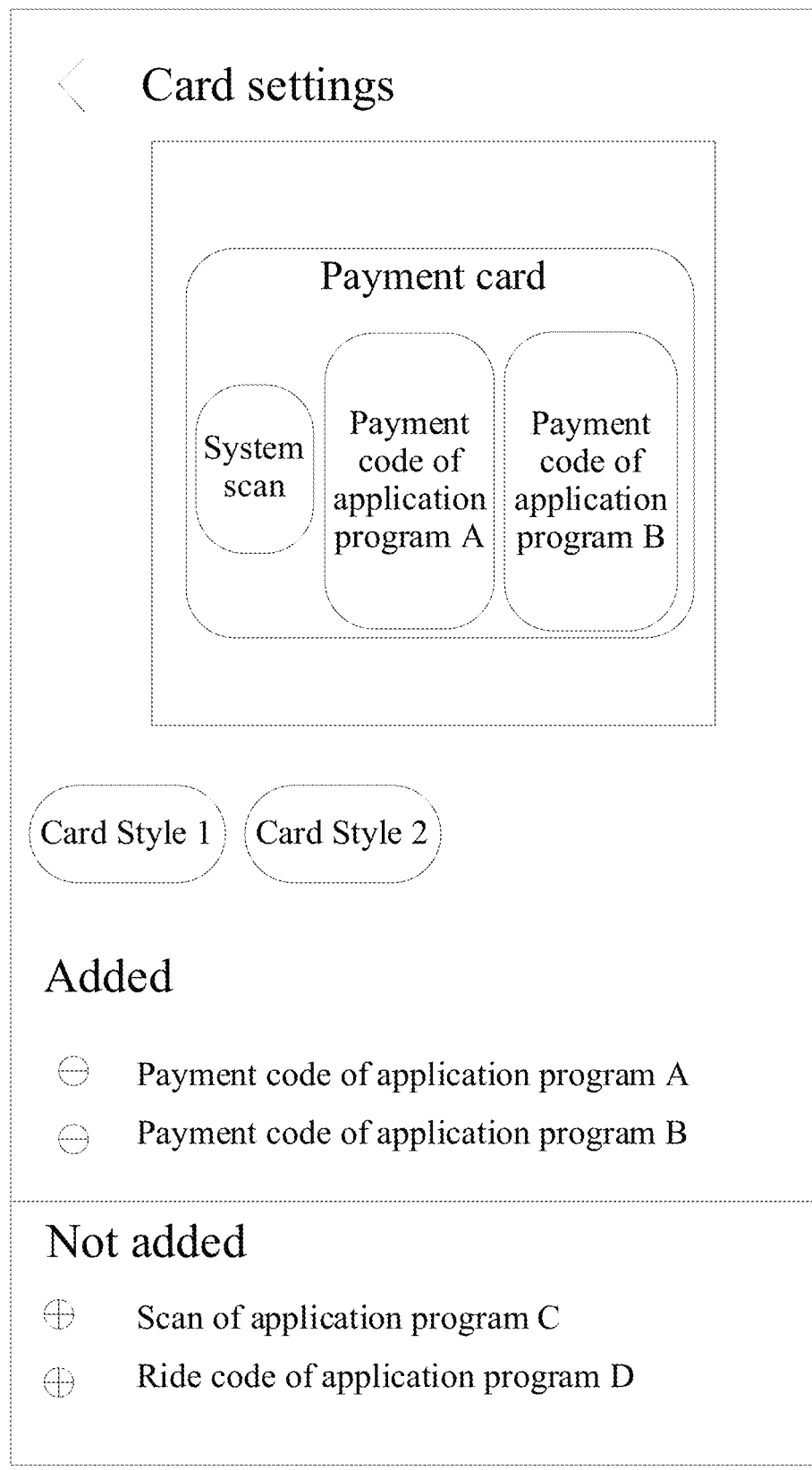
FIG. 9 is a schematic diagram of second setting of a first interface according to an embodiment of the present application.

Herein, the display mode of the first interface may include an opening mode in the lock screen state and an opening mode in the screen-off state. For example, as shown in FIG. 8, a user slides leftwards in the lock screen state to open a card package (the card package has multiple payment cards, such as a first payment card and a second payment card, the first payment card can also be called a first interface, and the second payment card can also be called a second interface) and a user slides leftwards in the screen-off state to open the card package. Through the editing option, a user can delete and add different cards, and can long press and drag to sort and adjust the priorities of the cards. As shown in FIG. 9, a user can also add and delete specific functions in the card through the editing option, such as adding or deleting payment controls, can drag and sort the payment controls in the card, and place the most frequently used functions at optimal locations.

An opening mode of the first interface or the payment control on the first interface in the lock screen state and/or the screen-off state can be edited through the setting control, so that the first interface can meet the personalized needs of users.

In some implementations, after the first interface is displayed, the payment interface display method further includes:

receiving a fifth input performed on the first interface; and displaying a second interface in response to the fifth input, where the second interface includes at least one payment control, each payment control is associated with a payment function interface, and the payment control in the first interface is different from the payment control in the second interface.

The fifth input may be a slide input. According to the above description, it can be seen that the embodiments of the present application may include multiple cards, the first interface is the first card, the second interface is the second card, and the payment controls in the two cards are different. After the first interface is displayed, the first interface can be switched to the second interface by a sliding input, so that the user can conveniently switch between multiple cards.

In the embodiments of the present application, the card package function can be exited from through preset gestures, for example, click and slide outside the card, or slide rightwards in a card area to exit from the card, or the card package function can be exited from through bottom return, home, and the like.

In the payment interface display method of the embodiments of the present application, in any state of the electronic device, especially in the screen-off state or lock screen state, the card package can be called by sliding leftwards from the right side of the screen, providing the user with a global and convenient way to access various payment scenarios and related functions. Besides, combined with the form of the card, the sense of reality of usage is increased, and users can completely customize the functions and cards that they want. Considering the security, the process of unlock verification of the lock screen has also been added. After verification, the corresponding functions can be directly accessed, which shortens the operation path and improves the use efficiency.

It should be noted that, the payment interface display method provided in the embodiments of the present application may be executed by a payment interface display apparatus, or a control module in the payment interface display apparatus for executing the payment interface display method. In the embodiments of the present application, an example in which the payment interface display apparatus performs the payment interface display method is used to describe the payment interface display method provided in the embodiments of the present application.

Figure 10:
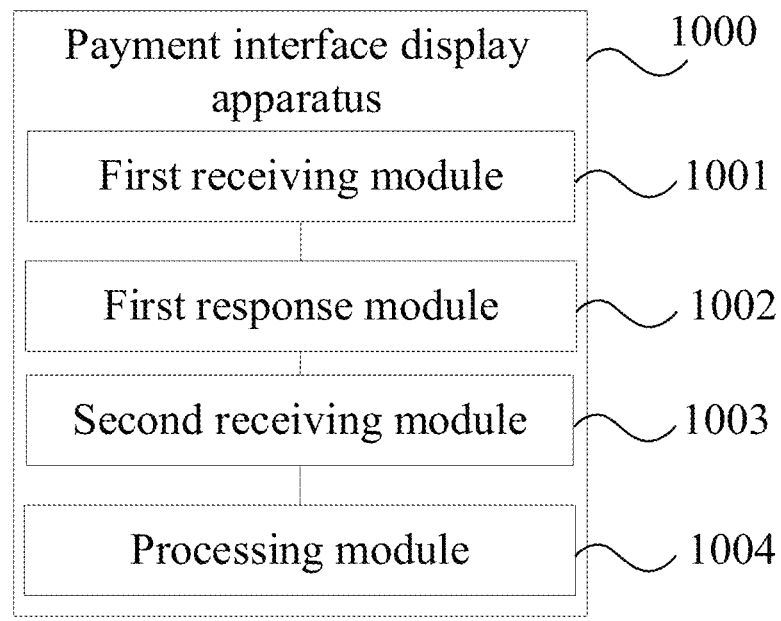
FIG. 10 is a schematic diagram of modules of a payment interface display apparatus according to an embodiment of the present disclosure.

As shown in FIG. 10, embodiments of the present application provide a payment interface display apparatus 1000, including:

a first receiving module 1001, configured to receive a first input; and a first response module 1002, configured to display a first interface in response to the first input, where the first interface includes at least one payment control, and each payment control is associated with a payment function interface;

a second receiving module 1003, configured to receive a second input for a target payment control, where the target payment control is a payment control of the at least one payment control; and a processing module 1004, configured to display, in response to the second input, a target payment function interface associated with the target payment control.

In the payment interface display apparatus according to the embodiments of the present application, the processing module is configured to: when unlock verification information matches preset unlock verification information, display, in response to the second input, the target payment function interface associated with the target payment control.

The payment interface display apparatus of the embodiments of the present application further includes:

a third receiving module, configured to: in the case that the screen is not unlocked, receive a third input on the first interface, where the third input is an input performed on an unlock verification control on the first interface, or the third input is a predetermined input at a predetermined position on the first interface; and a second response module, configured to obtain unlock verification information in response to the third input.

In the payment interface display apparatus of the embodiments of the present application, the second response module includes:

a response submodule, configured to display an unlock interface of the electronic device in response to the third input, where the unlock interface includes a virtual input keyboard and a screenshot of the first interface; and an obtaining submodule, configured to obtain unlock verification information input by the user through the virtual input keyboard.

In the payment interface display apparatus of the embodiments of the present application, the first interface includes a setting control, and the payment interface display apparatus further includes:

a fourth receiving module, configured to receive a fourth input performed on the setting control; and a third response module, configured to display a setting interface of the first interface in response to the fourth input, where the setting interface includes at least one of a display option and an editing option;

where the display option is used to set a display mode of the first interface in the lock screen state and/or the screen off state, and the editing option is used to add, delete, and/or move a payment control on the first interface.

The payment interface display apparatus of the embodiments of the present application further includes:

a fifth receiving module, configured to receive a fifth input on the first interface after the processing module displays the first interface; and a fourth response module, configured to display a second interface in response to the fifth input, where the second interface includes at least one payment control, each payment control is associated with a payment function interface, and the payment control in the first interface is different from the payment control in the second interface.

In the payment interface display apparatus in the embodiments of the present application, at least one payment control is integrated on the first interface. After the first input is received, the first interface is quickly displayed, and the payment function interface required by the user can be directly accessed according to the second input and first information used to indicate whether the screen is unlocked, which is easy to operate and greatly saves payment time and improves payment efficiency.

The payment interface display apparatus provided in this embodiment of the present application can implement processes implemented by the payment interface display apparatus in the method embodiments of FIG. 1 to FIG. 9. To avoid repetition, details are not described herein again.

The payment interface display apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle device, a wearable device, an Ultra-Mobile Personal Computer (UMPC), a netbook, a Personal Digital Assistant (PDA), or the like. The non-mobile electronic device may be a server, a Network Attached Storage (NAS), a personal computer, a television, a teller machine, a self-service machine, or the like. This is not specifically limited in the embodiments of the present application.

The payment interface display apparatus in the embodiments of the present application may be an apparatus with an operating system. The operating system may be an Android operating system, may be an iOS operating system, or may be another possible operating system, which is not specifically limited in the embodiments of the present application.

Figure 11:
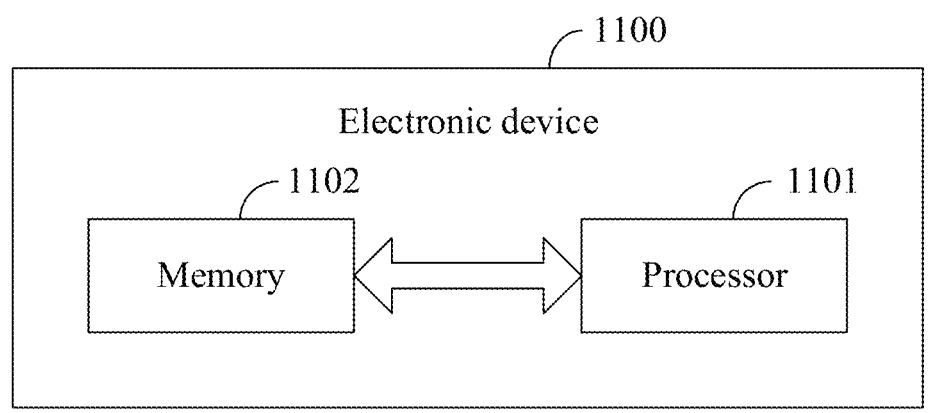
FIG. 11 is a first structural block diagram of an electronic device according to an embodiment of the present disclosure.

In some implementations, as shown in FIG. 11, the embodiments of the present application further provide an electronic device 1100, including a processor 1101, a memory 1102, and a program or an instruction stored in the memory 1102 and executable on the processor 1101. When the program or instruction is executed by the processor 1101, the various processes of the embodiment of the foregoing payment interface display method can be achieved. To avoid repetition, details are not repeated herein.

It should be noted that the electronic device in this embodiment of the present application includes the foregoing mobile electronic device and the foregoing non-mobile electronic device.

Figure 12:
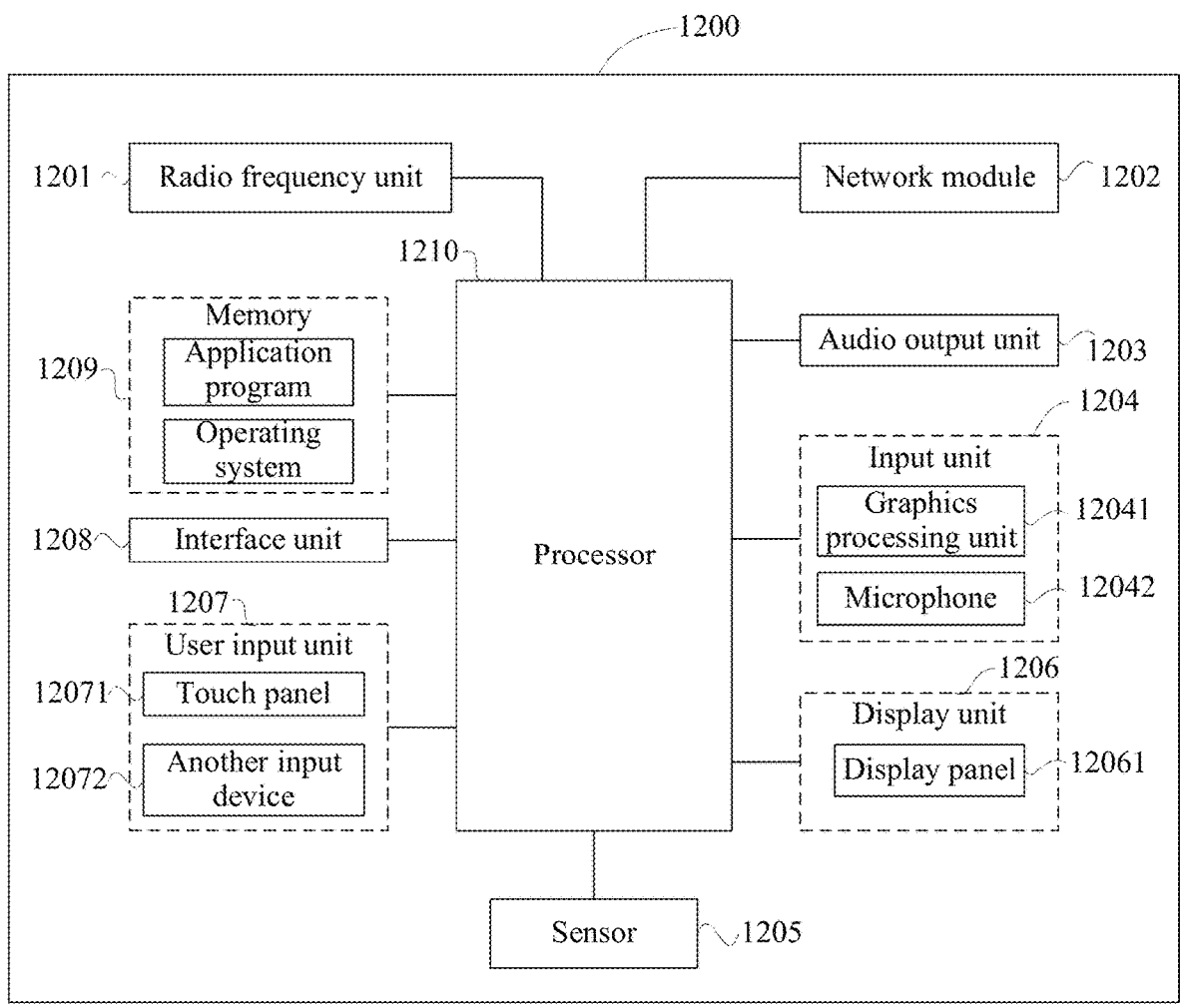
FIG. 12 is a second structural block diagram of an electronic device according to an embodiment of the present disclosure.

FIG. 12 is a schematic diagram of a hardware structure of an electronic device for implementing embodiments of the present application.

The electronic device 1200 includes, but is not limited to: a radio frequency unit 1201, a network module 1202, an audio output unit 1203, an input unit 1204, a sensor 1205, a display unit 1206, a user input unit 1207, an interface unit 1208, a memory 1209, a processor 1210, etc.

It may be understood by a person skilled in the art that the electronic device 1200 may further include a power supply (such as a battery) that supplies power to each component. The power supply may be logically connected to the processor 1210 by using a power management system, to implement functions such as charging, discharging, and power consumption management by using the power management system. A structure of the electronic device shown in FIG. 12 does not constitute a limitation on the electronic device, and may include more or fewer parts than those shown in the figure, or combine some components, or have different part arrangements. Details are not described herein again.

The user input unit 1207 is configured to receive a first input; the display unit 1206 is configured to display a first interface in response to the first input, where the first interface includes at least one payment control, and each payment control is associated with a payment function interface; the user input unit 1207 is configured to receive a second input for a target payment control, where the target payment control is a payment control in the at least one payment control; and the display unit 1206 is configured to display, in response to the second input, the target payment function interface associated with the target payment control.

In some implementations, the display unit 1206 is configured to: when unlock verification information matches preset unlock verification information, display, in response to the second input, the target payment function interface associated with the target payment control.

In some implementations, the input unit 1204 or the user input unit 1207 is configured to: in the case that the screen is not unlocked, receive a third input on the first interface, where the third input is an input performed on an unlock verification control on the first interface, or the third input is a predetermined input at a predetermined position on the first interface; and the processor 1210 is configured to obtain unlock verification information in response to the third input.

In some implementations, the display unit 1206 is configured to display an unlock interface of the electronic device in response to the third input, where the unlock interface includes a virtual input keyboard and a screenshot of the first interface; and obtain unlock verification information input by the user through the virtual input keyboard.

In some implementations, the first interface includes a setting control; the user input unit 1207 is configured to receive a fourth input performed on the setting control, and the display unit 1206 is configured to display a setting interface of the first interface in response to the fourth input, where the setting interface includes at least one of a display option and an editing option;

where the display option is used to set a display mode of the first interface in the lock screen state and/or the screen off state, and the editing option is used to add, delete, and/or move a payment control on the first interface.

In some implementations, the user input unit 1207 is configured to receive a fifth input on the first interface; the display unit 1206 is configured to display a second interface in response to the fifth input, where the second interface includes at least one payment control, each payment control is associated with a payment function interface, and the payment control in the first interface is different from the payment control in the second interface.

In the electronic device in the embodiments of the present application, at least one payment control is integrated on the first interface. After the first input is received, the first interface is quickly displayed, and the payment function interface required by the user can be directly accessed according to the second input, which is easy to operate and greatly saves payment time and improves payment efficiency.

It should be understood that, in this embodiment of the present application, the input unit 1204 may include a Graphics Processing Unit (GPU) 12041 and a microphone 12042, and the graphics processing unit 12041 processes image data of a still picture or a video obtained by an image capture apparatus (such as a camera) in a video capture mode or an image capture mode. The display unit 1206 may include a display panel 12061, and the display panel 12061 may be configured in a form of a liquid crystal display, an organic light-emitting diode, or the like. The user input unit 1207 includes a touch panel 12071 and another input device 12072. The touch panel 12071 is also referred to as a touchscreen. The touch panel 12071 may include two parts: a touch detection apparatus and a touch controller. The another input device 12072 may include but is not limited to a physical keyboard, a functional button (such as a volume control button or a power on/off button), a trackball, a mouse, and a joystick. Details are not described herein. The memory 1209 may be configured to store a software program and various data, including but not limited to an application program and an operating system. The processor 1210 may be integrated with an application processor and a modem processor. The application processor mainly processes an operating system, a user interface, an application program, and the like, and the modem processor mainly processes wireless communication. It can be understood that, in some implementations, the modem processor may not be integrated into the processor 1210.

An embodiment of the present application further provides a readable storage medium. The readable storage medium stores a program or an instruction, and when the program or the instruction is executed by a processor, each process of the embodiment of the foregoing payment interface display method is performed and the same technical effects can be achieved. To avoid repetition, details are not described herein again.

The processor is a processor in the electronic device in the foregoing embodiment. The readable storage medium includes a computer-readable storage medium such as a computer Read-Only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing payment interface display method. To avoid repetition, details are not described herein again.

It should be understood that the chip mentioned in this embodiment of the present application may also be referred to as a system-level chip, a system chip, a chip system, or a system on a chip.

It should be noted that in this specification, the term "include," "comprise," or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of the present application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may understand that the foregoing method embodiments may be implemented by using software and a required universal hardware platform, or certainly may be implemented by using hardware. Based on such an understanding, the technical solutions of the present application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of the present application.

It should be understood that division of modules is merely logical function division. The modules may be all or partially integrated in a physical entity or may be physically separated in an actual implementation. The modules may be all implemented in a form of software invoked by a processing component, or may be all implemented in a form of hardware; or a part of modules may be implemented in a form of software invoked by a processing component, and another part of modules may be implemented in a form of hardware. For example, a receiving module may be a processing element separately disposed, or may be integrated in a chip of the foregoing apparatus for implementation. In addition, the receiving module may be stored in a memory of the foregoing apparatus in a form of program code, and is invoked by a processing element of the foregoing apparatus to perform a function of the foregoing receiving module. The implementations of other modules are similar thereto. In addition, the modules may be all or partially integrated, or may be implemented independently. The processing element herein may be an integrated circuit having a signal processing capability. During implementation, various steps of the foregoing method or the foregoing modules may be completed through an integrated logic circuit of the hardware in the processor element or a command in the form of software.

For example, the modules, units, sub-units, or sub-modules may be one or more integrated circuits configured to implement the foregoing methods, for example, one or more Application Specific Integrated Circuit (ASIC), one or more microprocessors (Digital Signal Processor (DSP)), or one or more Field Programmable Gate Array (FPGA). For another example, when a module above is implemented by invoking program code by using a processing element, the processing element may be a general-purpose processor, for example, a Central Processing Unit (CPU) or another processor that can invoke program code. For another example, the modules may be integrated and implemented in a form of a System-On-a-Chip (SOC).

The embodiments of the present application are described with reference to the accompanying drawings. However, the present application is not limited to the foregoing specific implementations. The foregoing specific implementations are merely examples, but are not limiting. A person of ordinary skill in the art may make many forms without departing from the objective and the scope of the claims of the present application, and these forms all fall within the protection scope of the present application.

The invention claimed is:

1. A payment interface display method performed by an electronic device comprising a screen, comprising:
   receiving a first input moving on the screen of the electronic device to form a track route;
   generating one or more first payment controls in response to the first input, each of the one or more first payment controls linking to a payment function interface of a respective application program;
   displaying a first interface comprising the one or more first payment controls on the screen of the electronic device at least by:
      turning the screen ON from its OFF state to display an animation on the screen to follow the track route of the first input on the screen; and
      blurring other content on the screen;
   receiving a second input for a target payment control, wherein the target payment control is a payment control of the one or more first payment controls;
   in response to the second input, installing a first application program corresponding to the target payment control on the electronic device, wherein the first application program was not previously installed on the electronic device; and
   displaying, in response to the first application program being installed on the electronic device, a target payment function interface of the first application program associated with the target payment control on the screen,
   wherein after displaying the first interface, the method further comprises:
      receiving a fifth input performed on the first interface; and
      displaying a second interface in response to the fifth input, wherein the second interface comprises one or more second payment controls, wherein each of the one or more second payment controls is associated with a corresponding payment function interface and is different from the one or more first payment controls in the first interface.

2. The payment interface display method according to claim 1, wherein displaying, in response to the first application program being installed on the electronic device, the target payment function interface of the first application program associated with the target payment control on the screen comprises:
when unlock verification information matches preset unlock verification information, displaying the target payment function interface associated with the target payment control.

3. The payment interface display method according to claim 2, further comprising:
when the screen of the electronic device which displays the first interface is not unlocked, receiving a third input on the first interface, wherein the third input is an input performed on an unlock verification control on the first interface, or the third input is a predetermined input at a predetermined position on the first interface; and
obtaining unlock verification information in response to the third input.

4. The payment interface display method according to claim 3, wherein the obtaining unlock verification information in response to the third input comprises:
displaying an unlock interface of the electronic device in response to the third input, wherein the unlock interface comprises a virtual input keyboard and a screenshot of the first interface; and
obtaining unlock verification information input by the user through the virtual input keyboard.

5. The payment interface display method according to claim 1, wherein the first interface comprises a setting control; and the payment interface display method further comprises:
receiving a fourth input performed on the setting control; and
displaying a setting interface of the first interface in response to the fourth input, wherein the setting interface comprises at least one of a display option and an editing option,
wherein the display option is used to set a display mode of the first interface in the lock screen state or the screen off state, and the editing option is used to add, delete, or move a corresponding first payment control on the first interface.

6. An electronic device, comprising:
a screen;
a memory storing computer-readable instructions; and
a processor coupled to the memory and configured to execute the computer-readable instructions, wherein the computer-readable instructions, when executed by the processor, cause the processor to perform operations comprising:
receiving a first input moving on the screen of the electronic device to form a track route;
generating one or more first payment controls in response to the first input, each of the one or more first payment controls linking to a payment function interface of a respective application program;
displaying a first interface comprising the one or more first payment controls on the screen of the electronic device at least by:
turning the screen ON from its OFF state to display an animation on the screen to follow the track route of the first input on the screen; and
blurring other content on the screen;
receiving a second input for a target payment control, wherein the target payment control is a payment control of the one or more payment controls;
in response to the second input, installing a first application program corresponding to the target payment control on the electronic device, wherein the first application program was not previously installed on the electronic device; and
displaying, in response to the first application program being installed on the electronic device, a target payment function interface of the first application program associated with the target payment control on the screen,
wherein after displaying the first interface, the method further comprises:
receiving a fifth input performed on the first interface; and
displaying a second interface in response to the fifth input, wherein the second interface comprises one or more second payment controls, wherein each of the one or more second payment controls is associated with a corresponding payment function interface and is different from the one or more first payment controls in the first interface.

7. The electronic device according to claim 6, wherein displaying, in response to the first application program being installed on the electronic device, the target payment function interface of the first application program associated with the target payment control comprises:
when unlock verification information matches preset unlock verification information, displaying the target payment function interface associated with the target payment control.

8. The electronic device according to claim 7, wherein the operations further comprise;
when the screen of the electronic device which displays the first interface is not unlocked, receiving a third input on the first interface, wherein the third input is an input performed on an unlock verification control on the first interface, or the third input is a predetermined input at a predetermined position on the first interface; and
obtaining unlock verification information in response to the third input.

9. The electronic device according to claim 8, wherein the obtaining unlock verification information in response to the third input comprises:
displaying an unlock interface of the electronic device in response to the third input, wherein the unlock interface comprises a virtual input keyboard and a screenshot of the first interface; and
obtaining unlock verification information input by the user through the virtual input keyboard.

10. The electronic device according to claim 6, wherein the first interface comprises a setting control, and the operations further comprise:
receiving a fourth input performed on the setting control; and
displaying a setting interface of the first interface in response to the fourth input, wherein the setting interface comprises at least one of a display option and an editing option,
wherein the display option is used to set a display mode of the first interface in the lock screen state or the screen off state, and the editing option is used to add, delete, or move a corresponding first payment control on the first interface.

11. A non-transitory computer-readable medium storing instructions that, when executed by a processor, cause the processor to perform operations comprising:
   receiving a first input moving on a screen of an electronic device to form a track route;
   generating one or more first payment controls in response to the first input, each of the one or more first payment controls linking to a payment function interface of a respective application program;
   displaying a first interface comprising the one or more first payment controls on the screen of the electronic device at least by:
      turning the screen ON from its OFF state to display an animation on the screen to follow the track route of the first input on the screen; and
      blurring other content on the screen;
   receiving a second input for a target payment control, wherein the target payment control is a payment control of the one or more first payment controls;
   in response to the second input, installing a first application program corresponding to the target payment control on the electronic device, wherein the first application program was not previously installed on the electronic device; and
   displaying, in response to the first application program being installed on the electronic device, a target payment function interface of the first application program associated with the target payment control on the screen,
   wherein after displaying the first interface, the method further comprises:
      receiving a fifth input performed on the first interface; and
      displaying a second interface in response to the fifth input, wherein the second interface comprises one or more second payment controls, wherein each of the one or more second payment controls is associated with a corresponding payment function interface and is different from the one or more first payment controls in the first interface.

12. The non-transitory computer-readable medium according to claim 11, wherein displaying, in response to the first application program being installed on the electronic device, the target payment function interface of the first application program associated with the target payment control on the screen comprises:
   when unlock verification information matches preset unlock verification information, displaying the target payment function interface associated with the target payment control.

13. The non-transitory computer-readable medium according to claim 12, wherein the operations further comprise:
   when the screen of the electronic device which displays the first interface is not unlocked, receiving a third input on the first interface, wherein the third input is an input performed on an unlock verification control on the first interface, or the third input is a predetermined input at a predetermined position on the first interface; and
   obtaining unlock verification information in response to the third input.

14. The non-transitory computer-readable medium according to claim 13, wherein the obtaining unlock verification information in response to the third input comprises:
   displaying an unlock interface of the electronic device in response to the third input, wherein the unlock interface comprises a virtual input keyboard and a screenshot of the first interface; and
   obtaining unlock verification information input by the user through the virtual input keyboard.

15. The non-transitory computer-readable medium according to claim 11, wherein the first interface comprises a setting control, and the operations further comprise:
   receiving a fourth input performed on the setting control; and
   displaying a setting interface of the first interface in response to the fourth input, wherein the setting interface comprises at least one of a display option and an editing option,
   wherein the display option is used to set a display mode of the first interface in the lock screen state or the screen off state, and the editing option is used to add, delete, or move a corresponding first payment control on the first interface.

* * * * *